Patented July 5, 1949

2,474,849

UNITED STATES PATENT OFFICE 2,474,849

PRODUCTION OF ORGANIC DISULFIDES

Morton Kleiman, Chicago, Ill., assignor to Velsicol Corporation, Chicago, Ill., a corporation of Illinois No Drawing. Application December 20, 1946, Serial No. 717,599

6 Claims. (Cl. 204—158)

This invention relates to organo-thiyl compounds, such as organic disulfides and mercaptans, and to a process for producing the same. More particularly, my invention relates to new classes of organic disulfides and new compositions of matter, as well as to methods whereby these and related known materials may be prepared.

One object of this invention is to provide a new process for preparing symmetrical and unsymmetrical organic disulfides. A symmetrical disulfide is herein defined as a compound of the general formula RSSR, wherein R represents any organic radical. An unsymmetrical organic disulfide is herein defined as a compound of the general formula RSSR', wherein R and R' represent two different organic radicals.

Another object of this invention is the preparation of organic disulfides hitherto unknown and/or believed to be impossible of existence.

Another object of this invention is to provide a new and simplified process for producing organic disulfides which have heretofore been prepared only with great difficulty by previously known methods.

Another object relates to the production and recovery of mercaptans.

Other objects and advantages will become apparent hereinafter.

Heretofore, only a few unsymmetrical organic disulfides have been synthesized. These have included a number of variously substituted diaryl disulfides and aryl alkyl disulfides. The methods involved in the preparation of these compounds have all been severely limited, painstaking, and costly, and therefore generally unsuited to industrial practice. Furthermore, owing to the extremely limited utility of these methods, it has never before been possible to synthesize most of the vast number of unsymmetrical disulfides theoretically capable of existence. Thus, no successful synthesis of any of the following types of unsymmetrical disulfides has heretofore been recorded:

1. Di-aliphatic and substituted di-aliphatic disulfides, such as, for example, methyl n-amyl disulfide, methyl beta-hydroxyethyl disulfide, or ethyl beta-chloroethyl disulfide.

2. Aliphatic alicyclic and substituted aliphatic alicyclic disulfides, such as, for example, ethyl cyclohexyl disulfide or ethyl 4-chlorocyclohexyl disulfide.

3. Substituted aliphatic aromatic disulfides, such as, for example, beta-hydroxyethyl phenyl disulfide, methyl 4-chlorophenyl disulfide, or isopropyl 3-nitrophenyl disulfide.

4. Aliphatic heterocyclic and substituted aliphatic heterocyclic disulfides, such as, for example, methyl 2-benzothiazyl disulfide, ethyl 2-thienyl disulfide, or methyl 2-pyridyl disulfide.

5. Di-alicyclic and substituted di-alicyclic disulfides, such as, for example, cyclopropyl cyclohexyl disulfide, or 4-bromocyclohexyl disulfide.

6. Alicyclic aromatic and substituted alicyclic aromatic disulfides, such as, for example, cyclohexyl naphthyl disulfide, cyclopentyl phenyl disulfide, or cyclopentyl 2-chlorophenyl disulfide.

7. Alicyclic heterocyclic and substituted alicyclic heterocyclic disulfides, such as, for example, cyclohexyl 4-pyridyl disulfide or cyclopentyl 2-benzothiazyl disulfide.

8. Aromatic heterocyclic and substituted aromatic heterocyclic disulfides, such as, for example, phenyl 2-thienyl disulfide or 4-nitrophenyl 2-pyrryl disulfide.

9. Di-heterocyclic and substituted di-heterocyclic disulfides, such as, for example, 4-pyridyl 2-benzothiazyl disulfide or 4-(2-chloropyridyl) 2-benzothiazyl disulfide.

Compounds belonging to any of the above classes may now be prepared simply, and in good yield by the process embodied in the present invention.

Broadly stated, my invention comprises providing an appropriate reaction mixture in which all the groups desired are present (but obviously not in the same combination as that of the finally desired compound or compounds) and effecting the redistribution of these groups by appropriate means, as described hereinafter.

Thus, in one specific embodiment, my invention relates to a method of synthesizing organic disulfides by effecting a redistribution of organo-thiyl groups, as described hereinafter, within a reaction mixture of organic disulfides wherein the organo-thiyl groups of the reactants are in combination different from that of the desired reaction product. The reaction mixture may be composed of different symmetrical organic disulfides, different unsymmetrical organic disulfides, or a mixture of symmetrical and unsymmetrical organic disulfides. For example, an unsymmetrical organic disulfide may be synthesized by subjecting to appropriate redistribution conditions a reaction mixture comprising two symmetrical organic disulfides.

In another specific embodiment, my invention relates to a method of synthesizing organic disulfides, either symmetrical or unsymmetrical, by effecting a redistribution of organo-thiyl groups, as described hereinafter, within a reaction mixture of an organic disulfide and a mercaptan wherein the organo-thiyl groups of the reactants are in combination different from that of the desired reaction product. The organic disulfide of the reaction mixture may be unsymmetrical or symmetrical. In the latter case the RS-group of the mercaptan should be different from those present in the symmetrical organic disulfide. In this embodiment mercaptans may be recovered as a product or by-product of the process.

In still another specific embodiment, my invention relates to the synthesis of symmetrical organic disulfides by effecting, as described hereinafter, a redistribution of the organo-thiyl groups of unsymmetrical organic disulfides.

The following are illustrative of some of the reactions which occur:

1. $RSSR + R'SSR' \rightleftharpoons 2RSSR'$
2. $RSSR + R'SH \rightleftharpoons RSSR' + RSH$
3. $RSSR + 2R'SH \rightleftharpoons R'SSR' + 2RSH$ Thus, in accordance with Equation (1), any particular unsymmetrical disulfide, RSSR', may be obtained by appropriate treatment as described hereinafter, of a mixture of the two symmetrical disulfides, RSSR, and R'SSR'. Conversely, unsymmetrical disulfides may be similarly converted and by subsequent suitable fractionation or other ordinary purification procedure separated into each of the symmetrical disulfides corresponding to the various RS-groups originally present.

In accordance with Equation (2), any particular unsymmetrical disulfide, RSSR', may be obtained by analogous treatment of an approximately equimolar mixture of a symmetrical disulfide, RSSR, and a mercaptan, R'SH.

In accordance with Equation (3), a symmetrical disulfide, R'SSR', may be obtained by reacting two or more mols of its corresponding thiol compound, R'SH, with approximately one mol of a different, symmetrical disulfide, RSSR. It is obvious that this same reaction may be utilized as well for producing mercaptans. A special case of this reaction is the catalyzed reduction of a disulfide by hydrogen sulfide; this reagent may be regarded as a mercaptan, reacting in accordance with the same general scheme, as follows:

4. 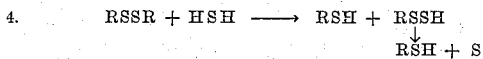
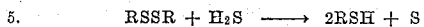

The end result being:

5. $RSSR + H_2S \longrightarrow 2RSH + S$

For carrying out the redistribution reactions described above in accordance with the present invention, the reactants are subjected to actinic radiation, as explained in greater detail hereinafter.

The processes embodied in the present invention involve effecting the redistribution reactions hereinbefore described photo-catalytically. This is accomplished simply by illuminating the reaction mixture for any particular redistribution with actinic radiation, i. e., with light in the ultra-violet and visible range, namely, 1500 to 7000 Angstrom units. These photochemical reactions are generally carried out at temperatures of from about 0° C. to about 225° C.; these temperature limits are not critical, however, for the photo-catalytic activity of light is in most cases independent of the temperature. This is especially true with actinic radiations of high energy content such as those in the ultra-violet range; with light of lower energy content, the reaction mixture is generally heated as it is being illuminated, the extent of the heat supplied depending upon the quality and quantity of the illumination.

Under the influence of such photo-chemical activation, the molecules of the reactants acquire sufficient energy to form some organo-thiyl free radicals; the latter effect the redistribution by the following types of chain reaction:

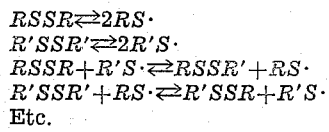

Etc.

The duration of the reaction period is dependent upon the quantity of energy absorbed in this photochemical process, and in general is not a critical factor. After the redistribution has been effected, the reaction product is separated by usual methods, such as distillation, crystallization, etc.

There are many important uses in industry and the arts for organic disulfides and mercaptans prepared in accordance with my invention, including both those previously known but which may now be prepared more simply and cheaply by the processes of my invention, and those which have not previously been known and which may now be prepared for the first time by the methods herein disclosed. Especially prominent among the many industrial applications of these known compounds is their utilization as modifiers, stabilizers, accelerators, anti-oxidants and vulcanizing agents in the manufacture of synthetic and natural rubber products. Among the large number of such compounds which are useful for these applications, the following may be mentioned as typical: Alpha- and beta-naphthyl mercaptans, o- and p-mercaptobiphenyls, diisopropyl dixanthogen, tolyl disulfide, alkyl phenol disulfides, 2-methylbutyl disulfide, 3-methylphentyl disulfide, 2-ethylhexyl disulfide, 2-mercaptobenzothiazole, 2-mercaptobenzoxazole, 2-mercapto-4-alkyl or aryl-thiazole, thioglycolic acid, thiolactic acid, beta-mercaptoethanol, diethiodiglycolic acid, bis-(beta-hydroxyethyl) disulfide, and bis-(beta-aminoethyl) disulfide.

Organic disulfides such as butyl disulfide, whose preparation from butyl mercaptan is described in Example 1, are excellent solvents for rubber, resins and plastics, and their use enables the utilization of a wide variety of special formulations of coating compositions which exploit the unique plasticizing properties of these materials—especially of rubber.

Many mercaptans and disulfides, previously known, but which may now be prepared more simply and economically by the processes of my invention, are chemical intermediates for the synthesis of sulfonic acids and sulfonium compounds which find extensive applications as wetting agents, detergents, emulsifiers and demulsifiers. Certain mercaptans, such as ethyl mercaptan, butyl mercaptan, and amyl mercaptan, and disulfides, such as furfuryl disulfide, are of considerable importance as odorants, the former as warning agents in gases and the latter as ingredients in perfumes. In the manufacture of particular types of glues and adhesives, certain vegetable proteins and albumenoids, such as soybean flour, linseed protein, etc., are treated with organic disulfides, such as methyl disulfide and butyl disulfide. Allyl disulfide and 2-methylallyl disulfide are valuable additives for imparting greater stability to films against the action of heat and ultra-violet light. The xanthates and dixanthogens are well known and have long been used as flotation agents. Other disulfides, such as dihexamethylenethiuram disulfide, dimorpholinethiuram disulfide, diphenyl disulfide, bis-(4-chlorophenyl) disulfide and beta-naphthyl disulfide, are of use as fungicides and insecticides. A number of disulfides, such as methyl disulfide and ethyl disulfide, are also used as additives in lubricating oils for improving the film strength and tenacity under high pressure, and as stabilizing agents in viscous, highly refined mineral oils, such as transformer oils.

In the category of organic disulfides which have hitherto been unknown and impossible to prepare by known methods but which may now be made according to the principles herein disclosed, are many compounds which I have found to possess properties valuable in industry and the arts. These compounds are useful in many of the applications enumerated above; in addition, particular compounds possess uniquely valuable characteristics.

Thus, for example, the new compound, methyl n-butyl disulfide, described in Example 2, combines the advantages of both the methylthiyl and the butylthiyl groups in one molecule, and will thus be found of greater value than either of the parent compounds in the manufacture of glue and adhesives. Methyl octyl disulfide, described in Example 3, will be found useful as an odorant, fixative, and co-solvent in perfumes. It is also an excellent solvent for rubber, resins and plastics, and therefore of value in special coating composition formulations. Methyl beta-hydroxyethyl disulfide and ethyl 2-benzothiazyl disulfide, described in Examples 5 and 6, respectively, will be found useful as rubber chemicals of the type previously described.

From the foregoing discussion and examples it is evident that my invention provides not only simple and inexpensive processes for preparing a large number of known mercaptans and disulfides but also makes possible the synthesis of hitherto unknown disulfides, the composition of which can be "tailored" to provide unique and specially desired characteristics.

Typical practice of this invention, its simplicity, and wide utility will be illustrated by the following specific examples, which are not intended to limit the invention in any respect:

Example 1

Reaction of a symmetrical organic disulfide with an excess of a mercaptan under the influence of visible light to form a different disulfide and mercaptan: Methyl disulfide and n-butyl mercaptan were reacted to give n-butyl disulfide and methyl mercaptan, as follows: Methyl disulfide (4.7 ml., 0.05 mol) and n-butyl mercaptan (21 ml., 0.2 mol) were placed in a reaction flask equipped with a reflux condenser, the outlet of which was connected to a trap cooled at −80° C. The mixture was illuminated by a No. 1 photoflood bulb placed at a distance of 1 cm. from the bottom of the flask, and was simultaneously heated by this light source to a vigorous reflux. After 4 hours, the cold trap had collected some methyl mercaptan and n-butyl disulfide was found upon fractional distillation of the rest of the reaction mixture at reduced pressure. Methyl n-butyl disulfide was also a product of the reaction.

The No. 1 photoflood bulb used in the foregoing and subsequent experiments, is an incandescent electric light bulb operating at 115–120 volts, consuming approximately 250 watts or using approximately 2.2 amperes. It produces about 8650 lumens, and has a mean color temperature of approximately 3400° K.

Example 2

Reaction of two symmetrical organic disulfides under the influence of ultra-violet irradiation to produce a new, unsymmetrical disulfide: Methyl disulfide and n-butyl disulfide were reacted to form methyl n-butyl disulfide, as follows: Methyl disulfide (10 ml.) and n-butyl disulfide (10 ml.) were irradiated with strong ultra-violet light for a period of three hours. The resulting mixture, upon fractional distillation under reduced pressure, gave methyl n-butyl disulfide, $b_{22}$ 77.5–78.5° C.

Example 3

Reaction of two symmetrical organic disulfides under the influence of visible light to produce a new, unsymmetrical disulfide: n-Octyl disulfide and methyl disulfide were reacted to give methyl n-octyl disulfide, as follows: Methyl disulfide (13.5 ml., 0.15 mol) and n-octyl disulfide (16.1 ml., 0.05 mol) were placed in a 50 ml. Pyrex flask connected by a ground glass joint to a reflux condenser. The mixture was illuminated and heated at vigorous reflux for three hours by a No. 1 photoflood bulb placed at a distance of 1 cm. from the bottom of the flask. The mixture was cooled and fractionally distilled at reduced pressure. After removal of the excess methyl disulfide in the forerun, clear, water-white methyl n-octyl disulfide (ca. 7 g.), $b_{0.3}$ 65–68° C., was obtained.

Example 4

Reaction of two symmetrical organic disulfides under the influence of visible light to produce a new, unsymmetrical disulfide: Methyl disulfide and n-butyl disulfide were reacted to give methyl n-butyl disulfide, as follows: Methyl disulfide (10 ml.) and n-butyl disulfide (10 ml.) were placed in the apparatus described in Example 3 and the mixture was heated at reflux and illuminated by a No. 1 photoflood bulb for two hours. Fractionation of the reaction mixture at reduced pressure gave methyl n-butyl disulfide (9.3 g.), $b_{22}$ 77.5–78.5° C.

Example 5

Reaction of two symmetrical organic disulfides under the influence of ultra-violet irradiation to produce a new, unsymmetrical disulfide: Methyl disulfide and bis-(beta-hydroxyethyl) disulfide were reacted to give methyl beta-hydroxyethyl disulfide, as follows: Methyl disulfide (28.2 g., 0.3 mol) and bis-(beta-hydroxyethyl) disulfide (23.1 g., 0.15 mol) were sealed in a quartz tube and irradiated strongly with ultra-violet light. The reaction mixture was washed with water (to remove and recover unreacted bis-(beta-hydroxyethyl) disulfide), and the organic layer remaining was dried over anhydrous potassium carbonate. The excess methyl disulfide was removed by fractional distillation under reduced pressure, and the crude product remaining was then fractionated at 20 mm. of mercury pressure, giving methyl beta-hydroxyethyl disulfide, $b_{20}$ 112.5–113.5.° C.

Example 6

Reaction of two symmetrical organic disulfides under the influence of visible light to produce a new, unsymmetrical disulfide: Ethyl disulfide and benzothiazyl disulfide, were reacted to give ethyl benzothiazyl disulfide, as follows: Ethyl disulfide (36.6 g., 0.3 mol) and 2-benzothiazyl disulfide (6.7 g., 0.02 mol) were placed in a flask fitted with a reflux condenser and heated at vigorous reflux and illuminated for four hours by a No. 1 photoflood bulb placed at a distance of 1 cm. from the bottom of the flask. The reaction mixture was now cooled, and the excess ethyl disulfide distilled off at 20 mm. pressure. Distillation of the product gave ethyl benzothiazyl disulfide, $b_{0.005}$ 115–117° C.

Example 7

Reaction of two symmetrical organic disulfides under the influence of ultra-violet illumination to produce a new, unsymmetrical disulfide: Methyl disulfide and diisopropyl dixanthogen were reacted to give methyl isopropoxythioformyl disulfide, as follows: Methyl disulfide (200 g.) and diisopropyl dixanthogen (40 g.) were placed in a quartz reaction vessel and illuminated strongly with ultra-violet light for four hours. Fractional distillation of the mixture at reduced pressure gave recovered methyl disulfide and methyl isopropoxythioformyl disulfide, $b_{0.25}$ 50–52° C.

Example 8

Reaction of two symmetrical organic disulfides under the influence of visible light to produce a new, unsymmetrical disulfide: Methyl disulfide and tetramethylthiuram disulfide were reacted to give methyl N,N-dimethylaminothioformyl disulfide, as follows: The two reactants were heated at a vigorous reflux and illuminated for four hours by a No. 1 photoflood bulb in the manner already described in the previous examples. The product, methyl N,N-dimethylaminothioformyl disulfide, $b_{0.7}$ 104–108° C., was obtained upon fractional distillation of the reaction mixture at reduced pressure.

Example 9

Reaction of an unsymmetrical organic disulfide upon illumination with visible light: Ethyl phenyl disulfide was converted into ethyl disulfide and phenyl disulfide, as follows: Ethyl phenyl disulfide (25.0 g.) was illuminated with a No. 1 photoflood bulb for three hours in the manner described in Example 1. Fractionation of the reaction mixture under reduced pressure, and crystallization of the solid residue gave ethyl disulfide, ethyl phenyl disulfide, and phenyl disulfide in a molar ratio of approximately 1:2:1.

Other examples of various reactants, processes, and reaction products, are as follows:

Example 10

Ethyl n-butyl disulfide, an unsymmetrical, di-aliphatic disulfide, may be prepared from n-butyl mercaptan and ethyl disulfide in a 1:1 molar ratio, by reacting these materials under the influence of actinic radiation in the manner already described. Ethyl mercaptan is recovered as a by-product of this reaction.

Example 11

Ethyl 2-chloroethyl disulfide, an unsymmetrical, substituted, di-aliphatic disulfide, may be prepared from a mixture of the two symmetrical disulfides, ethyl disulfide, and bis-(2-chloroethyl) disulfide, by reacting these materials under the influence of actinic radiation as outlined above.

Example 12

Ethyl allyl disulfide, an unsymmetrical, di-aliphatic disulfide may be prepared similarly by reacting ethyl disulfide and allyl mercaptan in a 1:1 molar ratio under the influence of actinic radiation. Ethyl mercaptan is recovered as a by-product of this reaction.

Example 13

Isopropyl cyclopentyl disulfide, an unsymmetrical, aliphatic alicyclic disulfide, may be prepared from a mixture of the two symmetrical compounds, isopropyl disulfide and cyclopentyl disulfide, under the influence of actinic radiation as outlined above.

Example 14

Ethyl cyclohexyl disulfide, an unsymmetrical, aliphatic alicyclic disulfide, may be prepared from ethyl disulfide and cyclohexyl mercaptan in a 1:1 molar ratio, under the influence of actinic radiation in the manner already described. Ethyl mercaptan is recovered as a by-product of this reaction.

Example 15

Allyl 4-chlorocyclohexyl disulfide, an unsymmetrical, substituted, aliphatic alicyclic disulfide, may be prepared by reacting a mixture of the two symmetrical compounds, allyl disulfide and 4-chlorocyclohexyl disulfide, under the influence of actinic radiation in the manner described above.

Example 16

2-hydroxyethyl phenyl disulfide, a substituted, unsymmetrical, aliphatic aromatic disulfide, may be prepared by reacting a mixture of the two symmetrical disulfides, bis-(2-hydroxyethyl) disulfide, and phenyl disulfide, under the influence of actinic radiation in the manner already described.

Example 17

2-chloropropyl alpha-naphthyl disulfide, a substituted, unsymmetrical, aliphatic aromatic disulfide, may be prepared by reacting a mixture of the two symmetrical disulfides, bis-(2-chloropropyl) disulfide and bis-(alpha-naphthyl) disulfide, under the influence of actinic radiation, as already described.

Example 18

Methyl 4-chlorophenyl disulfide, an unsymmetrical, substituted, aliphatic aromatic disulfide, may be prepared by reacting a mixture of methyl disulfide and 4-chlorothiophenol in a 1:1 molar ratio, under the influence of actinic radiation in the manner already described in greater detail above. Methyl mercaptan is recovered as a by-product of this reaction.

Example 19

Ethyl 2-thienyl disulfide, an unsymmetrical, aliphatic heterocyclic disulfide, may be prepared by reacting ethyl disulfide and 2-mercaptothiophene in a 1:1 molar ratio, under the influence of actinic radiation as outlined above. Ethyl mercaptan is recovered as a by-product of this reaction.

Example 20

Methyl 2-pyridyl disulfide, an unsymmetrical, aliphatic heterocyclic disulfide, may be prepared from methyl disulfide and 2-mercaptopyridine by reacting these two materials in a 1:1 molar ratio under the influence of actinic radiation. Methyl mercaptan is recovered as a by-product of this reaction.

Example 21

Allyl 4-(2-chloropyridyl) disulfide, an unsymmetrical, substituted, aliphatic heterocyclic disulfide, may be prepared in the same manner from a mixture of the two symmetrical disulfides, allyl disulfide, and bis-[4-(2-chloropyridyl)] disulfide, by reacting these two reactants under the influence of actinic radiation.

Example 22

Cyclopentyl cyclohexyl disulfide, an unsymmetrical, di-alicyclic disulfide, may be prepared in the manner already described from a mixture of the two symmetrical compounds, cyclopentyl disulfide and cyclohexyl disulfide, by reacting these materials under the influence of actinic radiation.

Example 23

3-chlorocyclohexyl cyclohexyl disulfide, a substituted, unsymmetrical di-alicyclic disulfide, may be prepared from a mixture of the two symmetrical compounds bis-(3-chlorocyclohexyl) disulfide and cyclohexyl disulfide by interacting the two in the usual manner under the influence of actinic radiation.

Example 24

Cyclopentyl cyclohexyl disulfide, an unsymmetrical, di-alicyclic disulfide may be prepared from cyclopentyl disulfide and cyclohexyl mercaptan in a 1:1 molar ratio by interacting the two under the influence of actinic radiation as described above. Cyclopentyl mercaptan is recovered as a by-product in this reaction.

Example 25

Cyclohexyl phenyl disulfide, an unsymmetrical, alicyclic aromatic disulfide, may be prepared in the usual manner from a mixture of the two symmetrical compounds, cyclohexyl disulfide and phenyl disulfide, by interacting these materials under the influence of actinic radiation.

Example 26

Cyclohexyl beta-naphthyl disulfide, an unsymmetrical, alicyclic aromatic disulfide, may be prepared similarly by irradiating a mixture of the two symmetrical compounds, cyclohexyl disulfide and beta-naphthyl disulfide.

Example 27

Cyclopentyl 2-chlorophenyl sulfide, an unsymmetrical, substituted, alicyclic aromatic disulfide, may be prepared in the manner already described by interacting cyclopentyl disulfide and 2-chlorothiophenol in a 1:1 molar ratio under the influence of actinic radiation. Cyclopentyl mercaptan is recovered as a by-product of this reaction.

Example 28

Cyclohexyl 4-pyridyl disulfide, an unsymmetrical, alicyclic heterocyclic disulfide, may be prepared in the usual manner by irradiating a mixture of the two symmetrical disulfides, cyclohexyl disulfide and bis-(4-pyridyl) disulfide.

Example 29

Cyclopentyl 2-benzothiazyl disulfide, an unsymmetrical, alicyclic heterocyclic disulfide, may be prepared from an equimolar mixture of cyclopentyl disulfide and 2-mercapto-benzothiazol by reacting these materials under the influence of actinic radiation. Cyclopentyl mercaptan may be recovered as a by-product of this reaction.

Example 30

4-Chlorocyclohexyl 2-thienyl disulfide, a substituted, unsymmetrical, alicyclic heterocyclic disulfide, may be prepared from a mixture of the two symmetrical compounds, bis-(4-chlorocyclohexyl) disulfide and bis-(2-thienyl) disulfide by interacting these materials under the influence of actinic radiation.

Example 31

Phenyl 2-thienyl disulfide, an unsymmetrical, aromatic heterocyclic disulfide, may be prepared by interacting in a 1:1 molar ratio, bis-(2-thienyl) disulfide and thiophenol under the influence of actinic radiation. 2-Mercaptothiophene is recovered as a by-product of this reaction.

Example 32

Phenyl 4-pyridyl disulfide, an unsymmetrical, aromatic heterocyclic disulfide, may be prepared from a mixture of the two symmetrical compounds, phenyl disulfide and bis-(4-pyridyl) disulfide, by interacting these two materials in the usual manner under the influence of actinic radiation.

Example 33

4-Nitrophenyl 2-thienyl disulfide, a substituted, unsymmetrical, aromatic heterocyclic disulfide, may be prepared by irradiating a mixture of the two symmetrical compounds, bis-(4-nitrophenyl) disulfide and bis-(2-thienyl) disulfide in the usual manner.

Example 34

2-Thienyl 4-pyridyl disulfide, an unsymmetrical, di-heterocyclic disulfide, may be prepared from a 1:1 molar mixture of bis-(2-thienyl) disulfide and 4-mercaptopyridine by interacting these two materials under the influence of actinic radiation. 2-Mercaptothiophene is recovered as a by-product of this reaction.

Example 35

4-Pyridyl 4-(2-chloropyridyl) disulfide, a substituted, unsymmetrical, di-heterocyclic disulfide, may be prepared by irradiating a mixture of the two symmetrical compounds, bis-(4-pyridyl) disulfide and bis-[4-(2-chloropyridyl)] disulfide.

Example 36

2-Thienyl 2-benzothiazyl disulfide, an unsymmetrical, di-heterocyclic disulfide, may be prepared from a mixture of the two symmetrical materials, bis-(2-thienyl) disulfide and bis-(2-benzothiazyl) disulfide by interacting these two materials in the usual manner under the influence of actinic radiation.

Other examples of the preparation of symmetrical disulfides by interaction of two mols of a mercaptan with one mol of a symmetrical disulfide are as follows:

Example 37

Phenyl disulfide, a symmetrical, aromatic disulfide, may be prepared by reacting a mixture of two or more mols of thiophenol and one mol of isopropyl disulfide under the influence of actinic radiation. Isopropyl mercaptan is recovered as a by-product of this reaction.

Example 38

Beta-naphthyl disulfide, a symmetrical, aromatic disulfide, is prepared from beta-mercaptonaphthalene when two or more mols of this compound are interacted with one mole of ethyl disulfide under the influence of actinic radiation.

Ethyl mercaptan is recovered as a by-product in this reaction.

*Example 39*

Bis-(4-pyridyl) disulfide, a symmetrical, di-heterocyclic disulfide, may be prepared by interacting two or more mols of 4-mercaptopyridine with one mole of methyl disulfide under the influence of actinic radiation. Methyl mercaptan is recovered as a by-product in this reaction.

Other examples of the formation of symmetrical disulfides by redistribution of an unsymmetrical organic disulfide at high temperatures are as follows:

*Example 40*

The unsymmetrical, substituted, aliphatic aromatic disulfide, 2-hydroxethyl phenyl disulfide, gives the symmetrical compounds bis-(2-hydroxyethyl) disulfide, and phenyl disulfide, when it is irradiated as already described.

*Example 41*

The unsymmetrical, di-aliphatic disulfide, ethyl allyl disulfide, gives the two symmetrical compounds, ethyl disulfide and allyl disulfide, by irradiating it in the usual manner.

*Example 42*

The unsymmetrical, aliphatic alicyclic disulfide, isopropyl cyclopentyl disulfide, likewise gives the two symmetrical compounds, isopropyl disulfide and cyclopentyl disulfide, by reacting it in the usual manner under the influence of actinic radiation.

Any of the numerous, unsymmetrical disulfides mentioned above will react in a similar manner under similar reaction conditions to furnish an equilibrium mixture of the two symmetrical disulfides which correspond to the organo-thiyl groups of the unsymmetrical disulfide.

The above description and examples are for illustration only and are not intended to limit the scope of the invention. Any departure therefrom which conforms to the spirit of the invention and comes within the scope of the appended claims is to be regarded as an embodiment of this invention.

I claim as my invention:

1. The method of synthesizing organic disulfides which comprises subjecting reactants containing different organo-thiyl groups selected from the group consisting of (a) mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by reacting said reactants under the influence of light of a wave length of from 1500 to 7000 angstrom units and at a temperature of from about 0° C. to about 225° C. and recovering organo-thiyl compounds in a molar quantity equal to that of the introduced reactants.

2. The method of synthesizing an unsymmetrical organic disulfide which comprises effecting the redistribution of the organo-thiyl groups within a mixture of organic disulfides—the organo-thiyl groups of said reactants being in combination different from that of the reaction products—by reacting said mixture at a temperature of from about 0° C. to about 225° C. under the influence of light of a wave length of from 1500 to 7000 angstrom units.

3. The method of synthesizing an unsymmetrical organic disulfide, RSSR', which comprises effecting the redistribution of the organo-thiyl groups within a mixture of two symmetrical organic disulfides, RSSR, and R'SSR', wherein R and R' represent two different organic radicals, by reacting said mixture at a temperature of from about 0° C. to about 225° C. under the influence of light of a wave length of from 1500 to 7000 angstrom units.

4. The method of synthesizing an unsymmetrical organic disulfide which comprises subjecting a mixture of an organic disulfide and a mercaptan—the organo-thiyl groups of said reactants being in combination different from that of the reaction products—to a redistribution of their organo-thiyl groups by reacting said mixture at a temperature of from about 0° C. to about 225° C. under the influence of light of a wave length of from 1500 to 7000 angstrom units and recovering the unsymmetrical organic disulfide and the mercaptan formed in the process.

5. The method of synthesizing an unsymmetrical organic disulfide which comprises subjecting a mixture of approximately molar equivalent quantities of a symmetrical organic disulfide, RSSR, and a mercaptan, R'SH, wherein R and R' represent two different organic radicals, to a redistribution of their organo-thiyl groups by reacting said mixture at a temperature of from about 0° C. to about 225° C. under the influence of light of a wave length of from 1500 to 7000 angstrom units, and recovering the unsymmetrical organic disulfide and the mercaptan formed in the process.

6. The method of synthesizing the symmetrical organic disulfides, RSSR, and R'SSR', which comprises subjecting an unsymmetrical organic disulfide, RSSR', wherein R and R' represent two different organic radicals, to a redistribution of its organo-thiyl groups by reacting said unsymmetrical organic disulfide at a temperature of from about 0° C. to about 225° C. under the influence of light of a wave length of from 1500 to 7000 angstrom units.

MORTON KLEIMAN.

REFERENCES CITED

The following references are of record in the file of this patent:

UNITED STATES PATENTS

| Number | Name | Date |
|---|---|---|
| 2,045,766 | Frolich et al. | June 30, 1936 |

OTHER REFERENCES

Ellis et al., Chemical Action of Ultraviolet Rays (1941), page 463.